(12) United States Patent
Andersson et al.

(10) Patent No.: US 11,286,847 B2
(45) Date of Patent: Mar. 29, 2022

(54) INTERNAL COMBUSTION ENGINE SYSTEM AND A METHOD FOR AN INTERNAL COMBUSTION ENGINE SYSTEM

(71) Applicant: VOLVO TRUCK CORPORATION, Gothenburg (SE)

(72) Inventors: Lennart Andersson, Varberg (SE); Arne Andersson, Mölnlycke (SE); Bengt Johansson, Lund (SE); Nhut Lam, Bjuv (SE); Staffan Lundgren, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/001,954

(22) Filed: Aug. 25, 2020

(65) Prior Publication Data
US 2020/0386151 A1 Dec. 10, 2020

Related U.S. Application Data

(63) Continuation of application No. 16/060,969, filed as application No. PCT/EP2016/080934 on Dec. 14, 2016, now Pat. No. 10,774,734.

(30) Foreign Application Priority Data

Dec. 14, 2015 (WO) ................. PCT/EP2015/079580

(51) Int. Cl.
*F02B 41/06* (2006.01)
*F02B 33/20* (2006.01)
(Continued)

(52) U.S. Cl.
CPC ............... *F02B 41/06* (2013.01); *F01B 1/06* (2013.01); *F01N 3/035* (2013.01); *F01N 3/103* (2013.01);
(Continued)

(58) Field of Classification Search
CPC .... F01N 13/0097; F01N 13/009; F01N 3/035; F01N 3/103; F01N 3/2066; F01B 1/06;
(Continued)

(56) References Cited

U.S. PATENT DOCUMENTS 3,389,694 A 6/1968 Dooley
4,157,080 A 6/1979 Hill
(Continued)

FOREIGN PATENT DOCUMENTS

CN 104093959 A 10/2014
CN 105089832 A 11/2015
(Continued)

OTHER PUBLICATIONS

China Office Action dated Dec. 3, 2020 in corresponding China Patent Application No. 201680073107.6, 20 pages.
(Continued)

*Primary Examiner* — Jesse S Bogue
(74) *Attorney, Agent, or Firm* — Venable LLP; Jeffri A. Kaminski

(57) ABSTRACT

The invention provides an internal combustion engine system (1) comprising—at least one combustor (3), and—a first expander (4) arranged to receive exhaust gases from at least one of the at least one combustor (3), and to expand and extract energy from the exhaust gases —characterized in that the system comprises a second expander (5) arranged to receive exhaust gases from the first expander (4), and to expand and extract energy from the exhaust gases.

16 Claims, 8 Drawing Sheets

(51) Int. Cl.

| | |
|---|---|
| *F02B 33/22* | (2006.01) |
| *F02B 37/00* | (2006.01) |
| *F02B 37/10* | (2006.01) |
| *F02B 37/24* | (2006.01) |
| *F02B 75/22* | (2006.01) |
| *F01N 3/10* | (2006.01) |
| *F01N 3/20* | (2006.01) |
| *F01N 3/035* | (2006.01) |
| *F01N 13/00* | (2010.01) |
| *F01B 1/06* | (2006.01) |
| *F02G 5/00* | (2006.01) |
| *F02B 33/06* | (2006.01) |
| *F02D 41/02* | (2006.01) |
| *F02D 41/00* | (2006.01) |

(52) U.S. Cl.
CPC ......... *F01N 3/2066* (2013.01); *F01N 13/009* (2014.06); *F01N 13/0097* (2014.06); *F02B 33/06* (2013.01); *F02B 33/20* (2013.01); *F02B 33/22* (2013.01); *F02B 37/004* (2013.01); *F02B 37/105* (2013.01); *F02B 37/24* (2013.01); *F02B 75/222* (2013.01); *F02B 75/227* (2013.01); *F02D 41/024* (2013.01); *F02G 5/00* (2013.01); *F02D 2041/001* (2013.01); *F02D 2200/0802* (2013.01); *Y02A 50/20* (2018.01); *Y02T 10/12* (2013.01)

(58) Field of Classification Search
CPC .......... F02B 33/06; F02B 33/20; F02B 33/22; F02B 37/004; F02B 37/105; F02B 37/24; F02B 41/06; F02B 75/222; F02B 75/227; F02D 2041/001; F02D 2200/0802; F02D 41/024; F02G 5/00; Y02A 50/2325; Y02T 10/144; Y02T 10/24; Y02T 10/26; F05D 2220/40; B60Y 2400/435
See application file for complete search history.

(56) References Cited

U.S. PATENT DOCUMENTS

| | | | | |
|---|---|---|---|---|
| 4,715,326 A | * | 12/1987 | Thring | ............... F02B 43/08 123/3 |
| 4,783,966 A | | 11/1988 | Aldrich | |
| 5,499,605 A | * | 3/1996 | Thring | ............... F02B 41/06 123/298 |
| 5,968,464 A | | 10/1999 | Peter-Hoblyn et al. | |
| 6,314,735 B1 | | 11/2001 | Kolmanovsky et al. | |
| 6,672,063 B1 | * | 1/2004 | Proeschel | ............... F02G 5/00 60/616 |
| 7,398,650 B2 | | 7/2008 | Böttcher et al. | |
| 7,975,485 B2 | * | 7/2011 | Zhao | ............... F02B 41/06 60/712 |
| 8,082,892 B2 | * | 12/2011 | Zhao | ............... F02B 47/02 123/25 P |
| 8,636,970 B2 | | 1/2014 | Osumi | |
| 9,777,653 B2 | * | 10/2017 | Petrovic | ............... F02D 41/024 |
| 9,810,122 B2 | * | 11/2017 | Martin | ............... F01N 3/2046 |
| 9,862,262 B2 | * | 1/2018 | Martin | ............... B60K 6/445 |
| 10,344,644 B2 | * | 7/2019 | Zsoldos | ............... F02D 41/0255 |
| 2009/0056667 A1 | | 3/2009 | Devine | |
| 2009/0173063 A1 | | 7/2009 | Boorse et al. | |
| 2009/0249773 A1 | | 10/2009 | Lambert et al. | |
| 2010/0300385 A1 | | 12/2010 | Durrett et al. | |
| 2012/0294786 A1 | | 11/2012 | Osumi | |
| 2013/0213363 A1 | | 8/2013 | Pruemm | |
| 2015/0128576 A1 | | 5/2015 | Osumi | |
| 2017/0268399 A1 | | 9/2017 | Döring | |

FOREIGN PATENT DOCUMENTS

| | | |
|---|---|---|
| CN | 105121815 A | 12/2015 |
| DE | 102013008827 A1 | 11/2014 |
| DE | 202015106082 U1 | 12/2015 |
| EP | 1728989 A1 | 12/2006 |
| GB | 2294501 A | 5/1996 |
| WO | 9958831 A1 | 11/1999 |
| WO | 2007099372 A1 | 9/2007 |

OTHER PUBLICATIONS

GB2294501, John Spiteri, Oct. 25, 1994.
International Search Report (dated Jul. 7, 2017) for corresponding International App. PCT/EP/2016/080934.
China Office Action dated Apr. 30, 2021 in corresponding China Patent Application No. 201680073107.6, 5 pages.
European Communication pursuant to Article 94(3) dated Sep. 29, 2020 in corresponding European Application No. 16812727.2, 4 pages.

* cited by examiner

INTERNAL COMBUSTION ENGINE SYSTEM AND A METHOD FOR AN INTERNAL COMBUSTION ENGINE SYSTEM

CROSS-REFERENCE TO RELATED APPLICATIONS

This patent application is a continuation of U.S. patent application Ser. No. 16/060,969, filed Jun. 11, 2018, which is a U.S. National Stage application of PCT/EP2016/080934, filed Dec. 14, 2016 and published on Jun. 22, 2017 as WO 2017/102813 A1, which is a continuation-in-part of International Application No. PCT/EP2015/079580, filed Dec. 14, 2015 and published on Jun. 22, 2017 as WO/2017/101965 A1, all of which is hereby incorporated by reference in its entirety.

TECHNICAL FIELD

The invention relates to an internal combustion engine system, a combined compressor and expander for an internal combustion engine system, a method for an internal combustion engine system, a computer program, a computer readable medium, and a control unit.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

BACKGROUND

It is known that internal combustion engines with two stages of compression and two stages of expansion, e.g. by a compressor, a combustor and an expander, may provide for reaching very high pressures and for extracting more energy from the fuel. However, a highly efficient vehicle engine may have very cool tailpipe exhaust, which may prevent or reduce the efficiency of exhaust treatment processes provided by exhaust treatment devices such as catalytic converters of various types. For certain processes, e.g. selective catalytic reduction (SCR), it is possible to compensate for low temperatures by providing large exhaust treatment devices; however, this will increase the weight and volume of the engine system, which may be a problem, particularly in vehicles, where often there are demanding space requirements.

US2010300385 discloses an engine with two stages of compression and two stages of expansion, where an oxidation catalyst is positioned between a power cylinder and an expander cylinder. However, for many exhaust treatment processes, e.g. SCR, such a location provides temperatures which are too high.

SUMMARY

An object of the invention is to reduce emissions from an internal combustion engine with a compressor, a combustor and an expander. An object of the invention is also to provide an internal combustion engine system with a compressor, a combustor and an expander, which provides an effective treatment of exhaust gases, while avoiding large increases of the volume and/or weight of the engine system.

The objects are reached with an internal combustion engine system comprising
at least one combustor, and
a first expander arranged to receive exhaust gases from at least one of the at least one combustor, and to expand and extract energy from the exhaust gases,
characterized in that the system comprises a second expander arranged to receive exhaust gases from the first expander, and to expand and extract energy from the exhaust gases.

Herein, the engine system is understood as comprising an internal combustion engine, in turn comprising the combustor, the first expander and the second expender.

The invention provides for the expansion of the engine system being done in at least three steps. In turn this provides for providing two different temperature ranges, one upstream of the first expander, and one between the first and second expanders. Thereby the engine system may provide a plurality of simultaneous temperature ranges, each suitable for one or more respective exhaust treatment processes.

Thus, the system may advantageously be provided with an exhaust treatment device arranged to receive exhaust gases from the first expander, to process the received exhaust gases, and to deliver the processed exhaust gases to the second expander. Thereby, it is possible to provide the exhaust treatment device in a form, e.g. as a selective catalytic reduction (SCR) catalyst, requiring a temperature range which is lower than the temperature range upstream of the first expander. In particular, the temperature range between the expanders may be kept higher than in a portion of an exhaust system communicating directly with the atmosphere, e.g. a vehicle tail pipe; however, the temperature range between the expanders may be kept lower than between the combustor and the first expander.

In a vehicle, where the exhaust treatment device is an SCR catalyst, the position in the elevated temperature between the expanders allows for a smaller SCR than if it would be positioned in the tailpipe. This makes it possible to provide the SCR catalyst as a cheap catalyst for nitrogen oxide (NOx) reduction in a temperature range 300-450 C with a high conversion. Specifically, the catalyst size may be reduced, which reduces the volume and weight of the engine system.

Advantageously, the system comprises an injector arranged to inject reductant for the exhaust treatment device, upstream of the first expander or into the first expander. Thereby, the timing and/or duration of the reductant injections by the injector may be coordinated with the actuation of an inlet valve of the first expander. This will provide good mixing of the reductant with the exhaust gases. It is understood that the reductant may be a solution of urea or another reductant useful for lowering particulant emissions and/or nitrogen oxide emissions from the engine. The reductant may a solution of organic and inorganic nitrogen compounds.

As also discussed below, where the reductant comprises urea, the first expander may promote thermolysis of the urea to decompose it into isocyanate and ammonia before it reaches the SCR catalyst. Thereupon the isocyanate may be processed by hydrolysis to provide ammonia. Injecting the reductant upstream of the first expander or into the first expander may support the thermolysis and the hydrolysis, since these processes will be enhanced by the heat therein. Advantageously, where the first expander is a piston expander, the injector may be arranged to inject reductant for the exhaust treatment device, into the first expander and onto the piston of the first expander, e.g. onto a piston crown of the piston. Thereby, the thermolysis and the hydrolysis may be particularly supported by heat stored in the piston, e.g. in a top section of the piston. For example, the heat stored in the piston crown of the piston may support the thermolysis and the hydrolysis.

Preferably, the system comprises in addition to said exhaust treatment device a pre-expander exhaust treatment device arranged to receive exhaust gases from the combustor, to provide an exhaust treatment process to the exhaust gases, and to deliver processed exhaust gases to the first expander. The pre-expander exhaust treatment device may comprise an oxidation catalyst, and/or a particulate filter. Where both are provided, the particulate filter may be located downstream of the oxidation catalyst. The system may further be arranged so that during an operation thereof, the pre-expander exhaust treatment device presents a temperature within the range of 550-1300° C., preferably within the range of 550-1100° C., e.g. within the range of 550-800° C. The pre-expander exhaust treatment device temperature may vary depending of the engine load. At full engine load, the pre-expander exhaust treatment device temperature may be e.g. 900-1100° C. Thereby, an advantageous distribution of exhaust treatment devices along the path of the exhaust gases may be provided, giving different temperatures which are each optimized for the respective exhaust treatment device.

It is understood that depending on the provision of the pre-expander exhaust treatment device, the first expander is arranged to receive processed or unprocessed exhaust gases from the combustor. Exhaust gases are herein understood as being processed if they are received from an exhaust treatment device.

In some embodiments, e.g. where there is no pre-expander exhaust treatment device, the first expander may be arranged to utilize pressure pulses in the exhaust gases received from the at least one of the at least one combustor, to increase the power output of the first expander.

Herein, the engine system is understood as comprising the engine, in turn comprising the combustor, the first expander and the second expender, and the engine system is understood as comprising the engine, and, where provided, the pre-expander exhaust treatment device, and the post-expander exhaust treatment device.

The invention is particularly advantageous where the system comprises a crankshaft, and the combustor comprises a piston arranged to reciprocate in a cylinder, and to drive the crankshaft. It is understood that the system may comprise a plurality of combustors, each comprising a piston arranged to reciprocate in a respective cylinder, whereby the pistons are all arranged to drive the crankshaft.

The first expander is preferably a piston expander arranged to drive the crankshaft with the extracted energy. Similarly, the second expander is preferably a piston expander arranged to drive the crankshaft with the extracted energy. The system may comprise at least one compressor, which may be a piston compressor, arranged to be driven by the crankshaft. Thus, the invention may be advantageously implemented in a multi-stage compression and expansion engine where the compressor(s) and the expanders are connected to the crankshaft. Such a connection may be direct or indirect, as exemplified below. Thereby, the system may present a high efficiency. Typically, the expanders may provide 30-50%, e.g. 40%, of the total power of the engine, and the compressor(s) may take 10-20% of the total power of the engine.

It should be noted however that within the scope of the claims, the first expander may be of a type other than a piston expander. For example, the first expander may be a turbine. The turbine may be arranged to drive a compressor for compressing air for the combustor, or it may be arranged to drive the crankshaft with the extracted energy. Similarly, the second expander may be of a type other than a piston expander. For example, the second expander may be a turbine. The turbine may be arranged to drive a compressor for compressing air for the combustor, or it may be arranged to drive the crankshaft with the extracted energy.

In some embodiments, where the system comprises a compressor arranged to compress air for at least one of the at least one combustor, the second expander may comprise a turbine arranged to drive the compressor or an additional compressor. Thereby, the system may be provided with a high power density. Where an additional compressor is provided, it may be arranged to deliver compressed air to said compressor arranged to compress air for at least one of the at least one combustor. Thus, an advantageous three step compression may be provided.

In an advantageous embodiment, where the system comprises a crankshaft, and a compressor arranged to compress air for at least one of the at least one combustor, the compressor and one of the first expander and the second expander are integrated so as to share a piston which is connected to the crankshaft. Thereby, the compressor and the one of the first expander and the second expander may form a combined compressor and expander whereby the piston is arranged to reciprocate in a shared cylinder, the combined compressor and expander being arranged to admit air to the shared cylinder, on a first side of the piston, and to compress the air, by means of the piston, for the combustor, the combined compressor and expander further being adapted to admit the exhaust gases, received by the one of the first expander and the second expander, to the shared cylinder, on a second side of the piston, to expand the exhaust gases by means of the piston.

The shared piston makes it possible to use the urge of the piston by the expander to deliver, in addition to power to the crankshaft, power for the air compression in a direct manner. More specifically, the exhaust gases may provide a direct pressure on the shared piston in turn serving to directly exert a direct pressure on the air. Thereby, mechanical losses for the transfer of this energy is substantially eliminated. Also, compared to providing the compressor and expander separately, the compressor and expander combination results in a reduced number of parts, since the piston and the cylinder are shared, thereby reducing the volume, weight, complexity and cost of the engine system.

Preferably, the combustor comprises an exhaust valve, herein also referred to as an outlet valve, the system further comprising a variable valve timing mechanism arranged to actuate the exhaust valve.

Preferably, the first expander comprises an expander inlet valve, the system further comprising an expander variable valve timing mechanism arranged to actuate the expander inlet valve. Thereby a possibility is provided to advantageously adjust the swallowing capacity of the first expander as exemplified below. For example, adjusting the temperature of an exhaust treatment device arranged to receive exhaust gases from the first expander, to process the received exhaust gases, and to deliver the processed exhaust gases to the second expander, may be done by adjusting the swallowing capacity of the first expander.

In some embodiments, the first expander is a variable-geometry turbine, e.g. of a variable-geometry turbocharger (VGT). This provides an alternative possibility to adjust the swallowing capacity of the first expander.

Preferably, the first expander comprises an expander exhaust valve, herein also referred to as an outlet valve, the system further comprising an expander variable valve timing mechanism arranged to actuate the expander exhaust valve. As exemplified below, this allows for an advantageous manner of controlling the temperature of the post-expander exhaust treatment device. For example, thereby the first expander may be used for increasing the temperature, e.g. at a cold start event, of an exhaust treatment device arranged to receive exhaust gases from the first expander, to process the received exhaust gases, and to deliver the processed exhaust gases to the second expander. For example, by advancing an opening event of the expander exhaust valve, so that it opens before a bottom dead center (BDC) position of the piston in the first expander, the expander exhaust valve may be opened before the expansion in the first expander is completed. Thereby, heat remaining in the gases in the first expander may be used to increase the exhaust treatment device temperature. In addition, the exhaust valve may be closed at the BDC position, and opened at a position after the BDC position, e.g. 45 crankshaft degrees after the BDC position. Thereby, a recompression of the gases in the first expander may occur, and the heat generated thereby may be used to increase the exhaust treatment device temperature.

In some embodiments, the first expander may comprise a hydrolysing reactor. This is particularly advantageous where the system comprises, as described above, an injector arranged to inject reductant for an exhaust treatment device, upstream of the first expander or into the first expander. Where the reductant comprises urea, e.g. where the exhaust treatment device is an SCR catalyst, the first expander may promote thermolysis of the urea to decompose it into isocyanate and ammonia before it reaches the catalyst. Thereupon the isocyanate may be processed by hydrolysis to provide ammonia. Injecting the reductant upstream of the first expander or into the first expander may support the thermolysis and the hydrolysis, since these processes will be enhanced by the heat therein. The hydrolysing reactor may involve as discussed above an injector arranged to inject reductant for an exhaust treatment device, into the first expander and onto a piston of the first expander. The first expander may also provide a beneficial thorough mixing of the reductant with the exhaust gases.

It should be noted that in some embodiments, an injector may be arranged to inject reductant downstream of the first expander. Thereby, an exhaust treatment device such as an SCR catalyst may be provided downstream of the second expander. This may provide a relatively long flow path for the reductant, past the second expander, to allow a good mix of the reductant and the exhaust gases.

The objects are also reached with an internal combustion engine system comprising
at least one combustor, and
an expander arranged to receive exhaust gases from at least one of the at least one combustor, and to expand and extract energy from the exhaust gases,
characterized in that the system comprises an exhaust treatment device arranged to receive exhaust gases from the expander, and to process the received exhaust gases,
and that the system comprises an injector arranged to inject reductant for the exhaust treatment device, upstream of the expander or into the expander.

The exhaust treatment device may be a selective catalytic reduction (SCR) catalyst. Thereby, by injecting reductant upstream of the expander or into the expander, advantage may be taken of a higher temperature of the exhaust gases before they are subjected to the expansion of the expander, to provide thermolysis of the reductant, e.g. where the reductant is provided in the form of urea, to provide ammonia for the process in the exhaust treatment device. In addition, such a system allows for the expander to form a mixing volume for the reductant, which in turn allows for reducing the volume downstream of the expander. Thereby, space can be saved which may be critical in a vehicle application.

Preferably, the injector is arranged to inject reductant for the exhaust treatment device, into the expander and onto a piston of the expander. Advantages thereof have been mentioned above.

The invention also provides a combined compressor and expander for an internal combustion engine system, comprising
a cylinder,
a piston adapted to be connected to a crankshaft of the engine system, and arranged to reciprocate in the cylinder,
the combined compressor and expander being adapted to admit air to the cylinder, on a first side of the piston, and to compress the air by means of the piston for a combustion process of the engine system,
the combined compressor and expander further being adapted to admit exhaust gases, obtained from a combustion process of the engine system and/or an exhaust gas treatment process of the engine system, to the cylinder, on a second side of the piston, to expand the exhaust gases by means of the piston to extract energy from the expanded exhaust gases.

Thereby the compressor and expander are integrated with each other, and one cylinder and piston combination may be used for both compression and expansion. The power extracted by the expander will contribute to driving the crankshaft and/or to compress the air. The air compression process may be driven by the crankshaft and/or the exhaust gas expansion. As mentioned, the compressor and expander combination results in a reduced number of parts, since the piston and the cylinder are shared, thereby reducing the volume, weight, complexity and cost of the engine system.

The objects are also reached with a vehicle.

The objects are also reached with a method for an internal combustion engine system comprising
at least one combustor, arranged to combust air and fuel,
a first expander arranged to receive exhaust gases from at least one of the at least one combustor, and to expand and extract energy from the exhaust gases,
a second expander arranged to receive exhaust gases from the first expander, and to expand and extract energy from the exhaust gases, and
an exhaust treatment device arranged to receive exhaust gases from the first expander, to process the received exhaust gases, and to deliver the processed exhaust gases to the second expander,
the method comprising adjusting the swallowing capacity of the first expander to control the temperature of the process in the exhaust treatment device.

The swallowing capacity of the first expander is understood as the capacity of the first expander to accept gases and pass them on to a conduit downstream of the expander. The swallowing capacity of the first expander is proportional to the mass flow through the first expander at a given intake pressure and temperature. A decreased swallowing capacity provides an increased strangulation of the gas flow. A decreased swallowing capacity of the first expander provides an increased pressure drop across the first expander. A decreased swallowing capacity may provide an increased first expander expansion ratio as understood by the pressure drop across the first expander.

By said method, an advantageous and reliable manner of controlling the temperature of the process in the exhaust treatment device is provided. For example, the method may comprise increasing the temperature of the exhaust treatment device by increasing the swallowing capacity of the first expander, and decreasing the temperature of the exhaust treatment device by decreasing the swallowing capacity of the first expander.

The first expander may be arranged to receive the exhaust gases by means of an expander inlet valve, an expander variable valve actuation mechanism being arranged to actuate the expander inlet valve, wherein adjusting the swallowing capacity of the first expander comprises adjusting the expander variable valve actuation mechanism. Thereby, the temperature control may be effected by means of readily available assemblies. The expander variable valve actuation mechanism may be e.g. a variable valve timing mechanism. The expander variable valve actuation mechanism may be of any suitable type, e.g. involving cam switching, cam phasing, an oscillating cam, an eccentric cam drive, a three-dimensional cam lobe, a two shaft combined cam lobe profile, a coaxial two shaft combined cam lobe profile, a helical camshaft, or a camless mechanism.

The method may comprise increasing the swallowing capacity of the first expander by delaying a closing event of the expander inlet valve, and decreasing the swallowing capacity of the first expander by advancing the closing event of the expander inlet valve. For example, in two stroke cycles of the first expander, the expander inlet valve may be controlled so as to open at a top dead center (TDC) position of the piston in the first expander, and so as to close at 25 crankshaft degrees after the TDC position. The swallowing capacity may be increased by delaying the inlet valve closing, e.g. to 30 crankshaft degrees after the TDC position. The swallowing capacity may be decreased by advancing the inlet valve closing, e.g. to 20 crankshaft degrees after the TDC position.

Preferably, the first expander is arranged to expel the exhaust gases by means of an expander exhaust valve, the expander variable valve actuation mechanism being arranged to actuate the expander exhaust valve, the method comprising controlling the expander variable valve actuation mechanism so as to adjust the expander exhaust valve to minimize the pressure difference across the expander exhaust valve at an opening event of the expander exhaust valve, and/or to minimize the pressure difference across the expander inlet valve at an opening event of the expander inlet valve. The adjustment of the expander exhaust valve to minimize the pressure difference across the expander inlet valve at an opening event of the expander inlet valve may be done by suitable control of an expander exhaust valve closing event, to provide a degree of recompression in the expander.

The objects are also reached with a method for an internal combustion engine system comprising
at least one combustor, arranged to combust air and fuel,
a first expander arranged to receive exhaust gases from at least one of the at least one combustor, and to expand and extract energy from the exhaust gases,
a second expander arranged to receive exhaust gases from the first expander, and to expand and extract energy from the exhaust gases, and
an exhaust treatment device arranged to receive exhaust gases from the first expander, to process the received exhaust gases, and to deliver the processed exhaust gases to the second expander,
the method comprising adjusting the swallowing capacity of the second expander to control the temperature of the process in the exhaust treatment device.

Similarly to the first expander, the swallowing capacity of the second expander is understood as the capacity of the second expander to accept gases and pass them on to a conduit downstream of the second expander. The swallowing capacity of the second expander is proportional to the mass flow through the second expander at a given intake pressure and temperature. A decreased swallowing capacity provides an increased strangulation of the gas flow. A decreased swallowing capacity of the second expander provides an increased pressure drop across the second expander. A decreased swallowing capacity may provide an increased second expander expansion ratio as understood by the pressure drop across the second expander.

Thereby, a further advantageous manner of controlling the exhaust treatment device temperature is provided. Increasing the temperature of the exhaust treatment device may be done by decreasing the swallowing capacity of the second expander, and decreasing the temperature of the exhaust treatment device may be done by increasing the swallowing capacity of the second expander.

Adjusting the swallowing capacity of the first expander and/or the second expander may advantageously be done in dependence on a rotational speed of the engine system and/or a requested torque for the engine system. For example, with a decreasing rotational speed of the engine system, the swallowing capacity of the first expander may be increased, and/or the swallowing capacity of the second expander may be decreased. As another example, with an increasing requested torque, providing an increased exhaust gas temperature, the swallowing capacity of the first expander may be decreased and/or the swallowing capacity of the second expander may be increased.

Preferably, the method comprises increasing the temperature of the exhaust treatment device by increasing the swallowing capacity of the first expander and decreasing the swallowing capacity of the second expander, and decreasing the temperature of the exhaust treatment device by decreasing the swallowing capacity of the first expander and increasing the swallowing capacity of the second expander. Thereby, a particularly effective temperature control is provided by combined adjustments of the first and second expander swallowing capacities. However, in some embodiments, the temperature of the exhaust treatment device is adjusted by adjusting the swallowing capacity of the first expander while keeping the swallowing capacity of the second expander constant. In further embodiments, the temperature of the exhaust treatment device is adjusted by adjusting the swallowing capacity of the second expander while keeping the swallowing capacity of the first expander constant. As suggested above, the first and second expanders may be of any suitable type, and they may be of the same type or of dissimilar types. The first expander may be a piston expander with a variable valve actuation mechanism or a variable-geometry turbine. The second expander may be a piston expander with a variable valve actuation mechanism or a variable-geometry turbine.

Preferably, the method comprises determining a temperature of the exhaust gases and, with an increasing exhaust gas temperature, decreasing the swallowing capacity of the first expander and increasing the swallowing capacity of the second expander, and, with a decreasing exhaust gas temperature, increasing the swallowing capacity of the first expander and decreasing the swallowing capacity of the second expander. Thereby, an accurate temperature control may be provided.

The objects are also reached with a method for an internal combustion engine system comprising a combustor arranged to combust air and fuel, an expander arranged to receive, expand and extract energy from exhaust gases from the combustor, and to expel the exhaust gases from the expander by means of an expander exhaust valve, and an exhaust treatment device arranged to receive the expelled exhaust gases from the expander and to process the exhaust gases, the method comprising controlling the expander exhaust valve to control the temperature of the process in the exhaust treatment device.

Said control of the expander exhaust valve may comprise controlling the temperature of the process in the exhaust treatment device to be within the range of 300-450° C. The method provides an effective manner of controlling the temperature of the exhaust treatment device, for keeping it within a range that is beneficial to the process therein. The distribution of exhaust treatment devices on both sides of the expander, as exemplified elsewhere herein, along with the control of the expander exhaust valves, provides an advantageous way of adapting the temperatures along the path of the exhaust gases for optimizing the processes in the exhaust treatment devices.

The objects are also reached with a method for an internal combustion engine system comprising a combustor arranged to combust air and fuel, an expander arranged to receive, expand and extract energy from exhaust gases from the combustor, the expander comprising an inlet valve, and an exhaust treatment device arranged to receive the exhaust gases from the expander and to process the exhaust gases, the method comprising
- injecting reductant for the exhaust treatment device upstream of the expander or into the expander,
- controlling the expander inlet valve to allow exhaust gases into the expander,
- wherein the timing and/or the duration of said reductant injection is coordinated with said control of the expander inlet valve so as for the reductant and the exhaust gases to mix in the expander.

It is understood that an injector may be arranged for said reductant injection. The method will provide good mixing of the reductant with the exhaust gases. Said reductant injection is preferably provided so that the injected reductant flows past the open expander inlet valve. Preferably, the reductant injection is commenced simultaneously with or after the opening of the expander inlet valve has commenced, and the reductant injection is terminated simultaneously with or before the closing of the expander inlet valve has been finalized.

The objects are also reached with a computer program, a computer readable medium, and a control unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
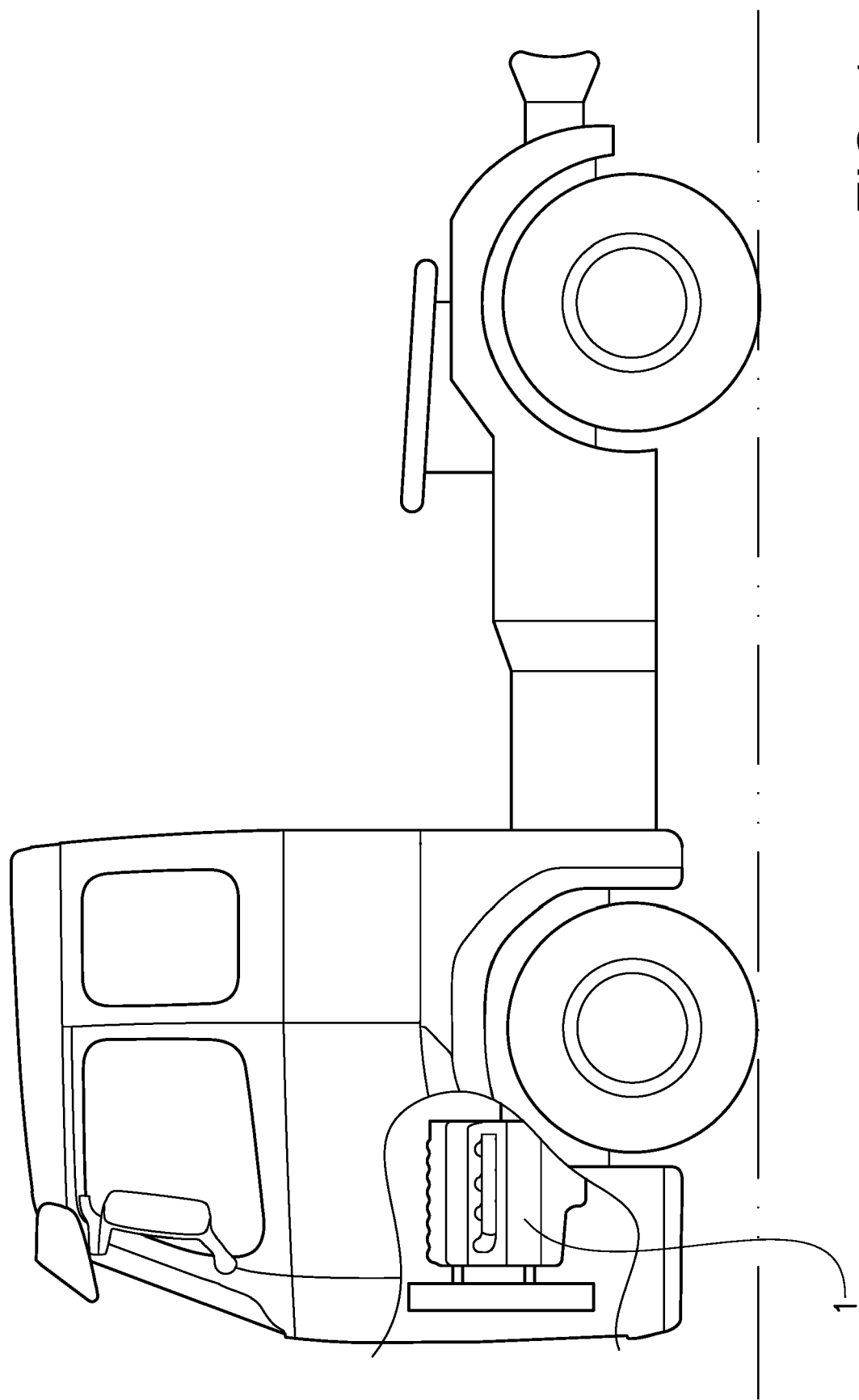
FIG. 1 is a partially sectioned side view of a vehicle in the form of a truck.

FIG. 1 shows a vehicle in the form of a truck, or a tractor for a semitrailer. It should be noted however that the invention is applicable to a variety of alternative types of vehicles, such as a car, a bus, or a working machine such as a wheel loader. The vehicle comprises an internal combustion engine system 1.

Figure 2:
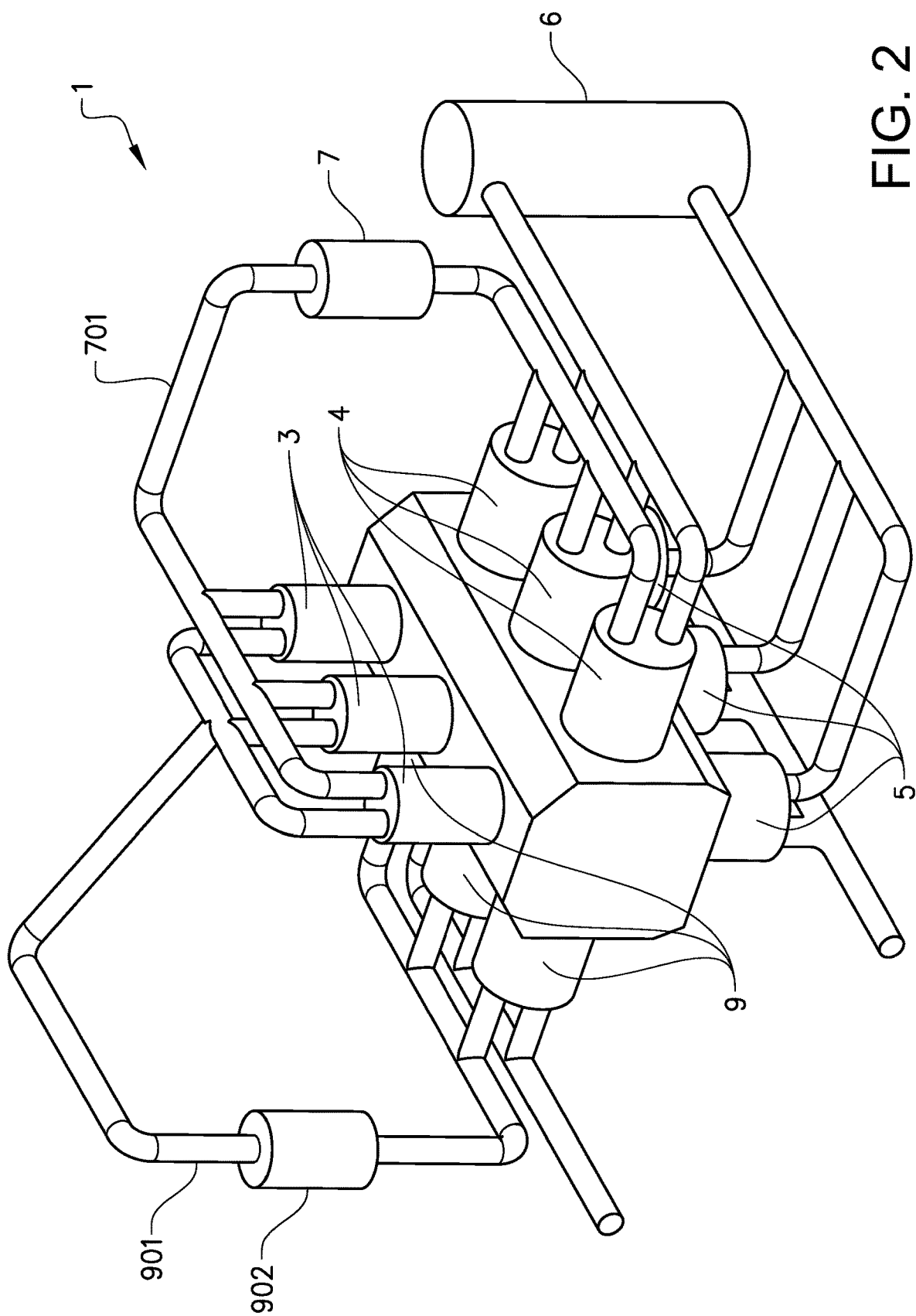
FIG. 2 is a schematic perspective view of an engine system in the vehicle in FIG. 1.

As can be seen in the schematic FIG. 2 the engine system 1 comprises a multi-stage compression and expansion internal combustion engine. The engine comprises three combustors 3, in the form of cylinders with pistons, and three piston compressors 9. The system further comprises an air guide 901 arranged to guide compressed air from the compressors 9 to the combustors 3. The air guide is provided with an air buffer container 902, arranged to receive compressed air from the compressors 9, to provide an air buffer volume for the compressed air, and to deliver the compressed air to the combustors 3.

The system further comprises three first piston expanders 4 arranged to expand exhaust gases from the combustors 3 and to extract energy from the expanded exhaust gases. An exhaust guide 701 is arranged to guide exhaust gases from the combustors 3 to the first expanders 4. The exhaust guide 701 comprises a pre-expander exhaust treatment device 7 described closer below.

The system further comprises a post-expander exhaust treatment device 6 in the form of a selective catalytic reduction (SCR) catalyst. The SCR catalyst 6 is arranged to receive exhaust gases from the first expander 4 and to provide an exhaust treatment process to the received exhaust gases, which process reduces nitrogen oxides (NOx) as is known per se. Three second piston expanders 5 are arranged to receive and expand exhaust gases from the SCR catalyst 6 and to extract energy from the expanded exhaust gases.

It is understood that the engine system may comprise any suitable number of combustors 3, compressors 9, first expanders 4, and second expanders 5. Herein, the engine is understood as comprising the combustors 3, the compressors 9, the first expanders 4 and the second expenders 5, and the engine system is understood as comprising the engine, the pre-expander exhaust treatment device 7, and the post-expander exhaust treatment device 6.

Figure 3:
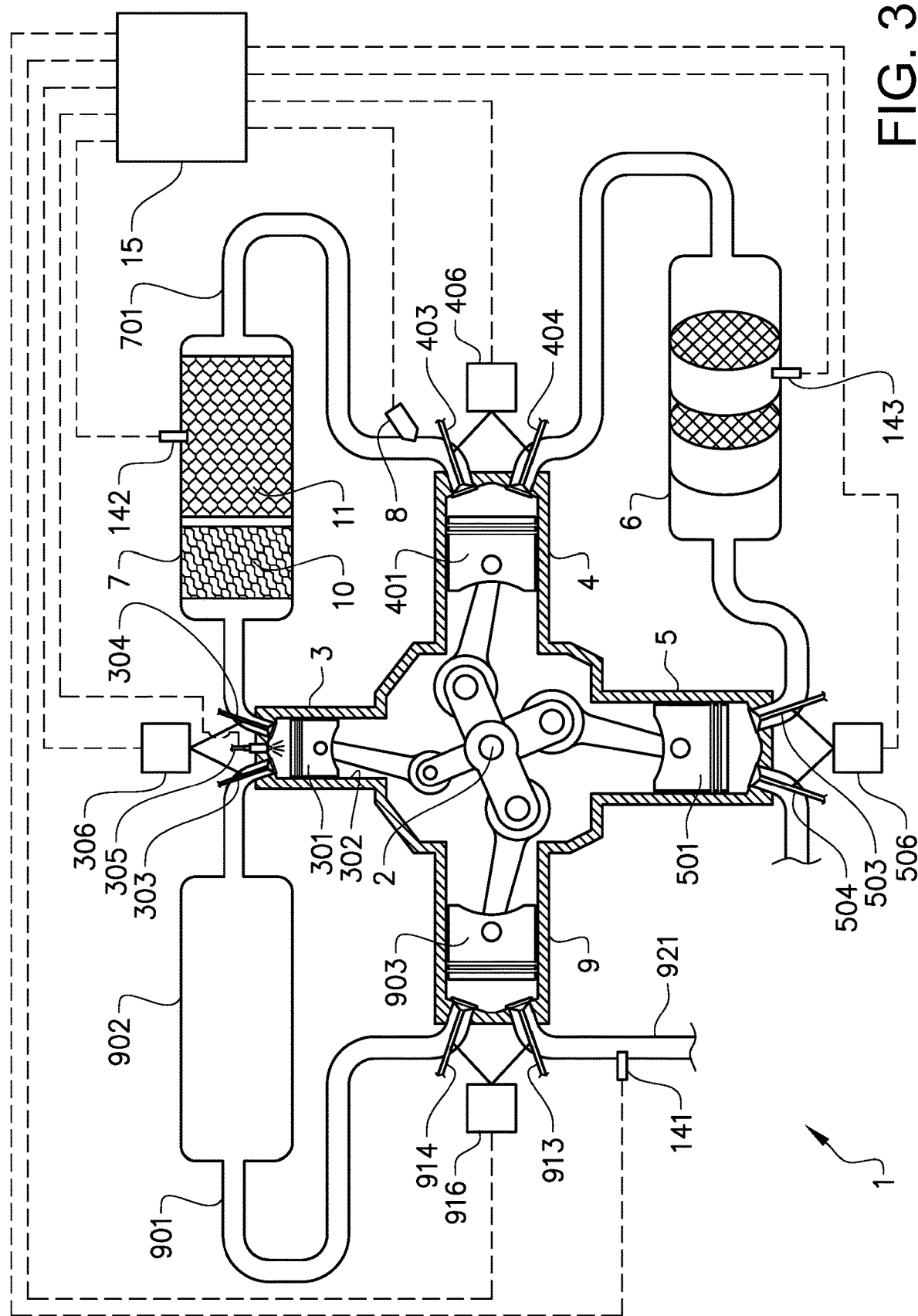
FIG. 3 is a schematic cross-sectional view of the engine system in FIG. 2.

Reference is made to FIG. 3 in which only one of the combustors 3, only one of compressors 9, and only one of the first expanders 4 are shown. The piston 301 of each combustor 3 is arranged to reciprocate in the respective cylinder 302, whereby the pistons are all arranged to drive a crankshaft 2 of the engine. For simplicity, the combustor 3, the compressor 9, and the first expander 4 are shown as all being located in the same cross-sectional plane; in a real implementation of the embodiment, the combustor 3, the compressor 9, and the first expander 4 are preferably offset in relation to each other along the crankshaft 2.

The pistons 401 of the first expanders 4 are arranged to drive the crankshaft 2 with the energy extracted from the exhaust gases from the combustors 3. The pistons 501 of the second expanders 5 are arranged to drive the crankshaft 2 with the energy extracted from the exhaust gases from the first expanders 4 and the SCR catalyst 6. Further, the pistons 903 of the compressors 9 are all arranged to be driven by the crankshaft 2.

The pre-expander exhaust treatment device 7 is arranged to provide an exhaust treatment process to the exhaust gases from the combustor 3. The pre-expander exhaust treatment device 7 comprises an oxidation catalyst 7, and a particulate filter 8 located downstream of the oxidation catalyst 7.

The engine system comprises a control unit 15 arranged to control various function of the system as described below.

The combustors 3 are provided with respective sets of combustor inlet and outlet valves 303, 304, arranged to be actuated by a combustor valve actuator assembly 306. The outlet valve 304 is herein also referred to as an exhaust valve 304. The combustor valve actuator assembly 306 may be arranged to actuate the combustor inlet and outlet valves 303, 304 in any manner known per se, e.g. with cams mounted on camshafts. The combustor valve actuator assembly 306 is controllable by the control unit 15, to adjust the timing and the maximum movements of the combustor inlet and outlet valves 303, 304, in any manner known per se. The combustor valve actuator assembly 306 is herein also referred to as a variable valve actuation mechanism or a variable valve timing mechanism 306.

In addition, the combustors 3 are provided with respective fuel injectors 305 for injecting a fuel into the cylinders 302. The fuel may be of any suitable type, e.g. diesel, methane e.g. in liquid natural gas (LNG), gasoline, etc. The fuel injectors 305 are controllable by the control unit 15. In this example, the combustors 3 are arranged to provide a Diesel cycle to extract work from the air and fuel provided. However, the invention is equally applicable to engines in which the combustors are arranged to provide an Otto cycle, wherein the engine system may be provided with means for air mass flow control, such as variable inlet and outlet valves 913, 914 of the compressors 9, described further below, for controlling the air supply to the combustors 3. Alternatively, or in addition, the means for air mass flow control may comprise one or more throttles for controlling the air supply to the combustors 3. The engine system may be provided with spark plugs in the combustors.

The first expanders 4 are provided with respective sets of first expander inlet and outlet valves 403, 404, arranged to be actuated by a first expander valve actuator assembly 406, including e.g. cams mounted on camshafts. The first expander valve actuator assembly 406 is controllable by the control unit 15, to adjust the timing and the maximum movements of the first expander inlet and outlet valves 403, 404. The first expander valve actuator assembly 406 is herein also referred to as a variable valve actuation mechanism or an expander variable valve timing mechanism 406.

Similarly, the second expanders 5 are provided with respective sets of second expander inlet and outlet valves 503, 504, arranged to be actuated by a second expander valve actuator assembly 506, including e.g. cams mounted on camshafts. The second expander valve actuator assembly 506 is controllable by the control unit 15, to adjust the timing and the maximum movements of the second expander inlet and outlet valves 503, 504. The second expander valve actuator assembly 506 is herein also referred to as a variable valve actuation mechanism or an expander variable valve timing mechanism.

In addition, the compressors 9 are provided with respective sets of said compressor inlet and outlet valves 913, 914, arranged to be actuated by a compressor valve actuator assembly 916, including e.g. cams mounted on camshafts. The compressor valve actuator assembly 916 is controllable by the control unit 15, to adjust the timing and the maximum movements of the compressor inlet and outlet valves 913, 914.

The system also comprises three injectors 8 arranged to inject reductant for the SCR catalyst 6. Each injector 10 is arranged to inject the reductant downstream of the pre-expander exhaust treatment device 7, into a respective portion of the exhaust guide 701 leading to the respective first expander 4. The injectors 8 are controllable by the control unit 15, to control the timing, the flow and the duration of the redundant injections. Specifically, the control unit 15 is arranged to control the timing and duration of the reductant injections so that they are coordinated with the actuations of the first expander inlet valves 403, in order to enable good mixing of the reductant with the exhaust gases in the respective first expander 4. In some embodiments, each injector 8 is arranged to inject the reductant directly into the respective exhaust first expander 4.

In some embodiments, a single reductant injector may be provided, e.g. where the engine system is provided with a single first expander 4 arranged to receive exhaust gases from a plurality of combustors 3. The single reductant injector may be thereby be arranged to inject the reductant upstream of, or into the single first expander.

The control unit 15 is also arranged to receive signals from a mass air flow (MAF) sensor 141, located in an air intake system 921 located upstream of the compressors 9 and arranged to guide air to the compressors 9. The control unit 15 is arranged to determine the load of the engine during its operation in the vehicle, as is known per se, e.g. based on signals from the MAF sensor 702, an accelerator pedal position (APP) sensor, (not shown), indicating a requested torque for the engine, and/or a manifold absolute pressure (MAP) sensor (not shown) in the air intake system 921. The load of the engine may also be based on the rotational speed of the engine.

The control unit 15 is further arranged to receive signals from a first temperature sensor 142, arranged at the pre-expander exhaust treatment device 7. The control unit 15 is arranged to determine the temperature in the pre-expander exhaust treatment device 7, based on signals from the first temperature sensor 142.

The control unit 15 is also arranged to receive signals from a second temperature sensor 143, arranged at the post-expander exhaust treatment device 6. The control unit 15 is arranged to determine the temperature in the post-expander exhaust treatment device 6, based on signals from the second temperature sensor 143.

Figure 4:
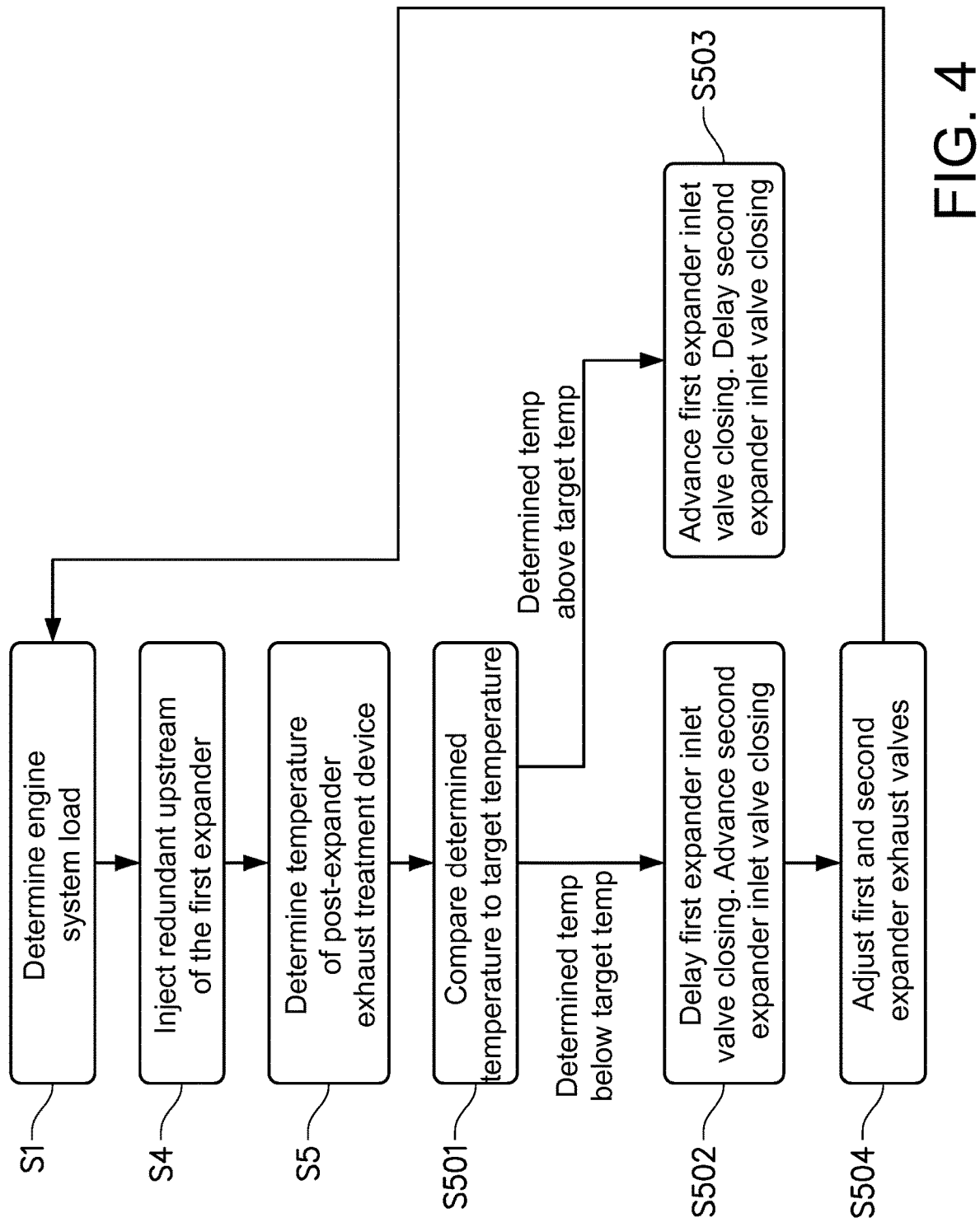
FIG. 4 is a flow diagram depicting steps in a method carried out in the system in FIG. 3.

Reference is made to FIG. 4 depicting steps in a method carried out in the system described above. During operation of the engine system in the vehicle, the control unit 15 determines S1 the load of the engine system, as described above.

The method involves controlling the injector 8, to inject S4 redundant upstream of the first expander for the post-expander exhaust treatment device. The timing and duration of the reductant injections are coordinated with the actuations of the first expander inlet valve 403, in order to enable good mixing of the reductant with the exhaust gases in the expander.

The method also involves controlling the temperature of the process in the post-expander exhaust treatment device 6. During operation of the engine system in the vehicle, the control unit 15 determines S5 the temperature of the post-expander exhaust treatment device 6, as described above.

The method comprises comparing S501 the temperature of the post-expander exhaust treatment device 6 with a target temperature of the post-expander exhaust treatment device 6. The target temperature may be predetermined; it may be a fixed value or a value determined in dependence on one or more operational parameters of the engine system.

If the determined temperature is below the target temperature, the first expander variable valve actuation mechanism 406 is adjusted S502 so as to delay, in the cycles of the first expander, a closing event of the first expander inlet valve 403, and the second expander variable valve actuation mechanism 506 is adjusted so as to advance, in the cycles of the second expander, a closing event of the second expander inlet valve 503. Thereby the swallowing capacity of the first expander is increased and the swallowing capacity of the second expander is decreased. Thereby the pressure and the temperature between the first and second expanders will be increased, whereby the temperature of the post-expander exhaust treatment device 6 will be increased.

If the determined temperature is above the target temperature, the first expander variable valve actuation mechanism 406 is adjusted S503 so as to advance, in the cycles of the first expander, the closing event of the first expander inlet valve 403, and the second expander variable valve actuation mechanism 506 is adjusted so as to delay, in the cycles of the second expander, the closing event of the second expander inlet valve 503. Thereby the swallowing capacity of the first expander is decreased and the swallowing capacity of the second expander is increased. Thereby the pressure and the temperature between the first and second expanders will be decreased, whereby the temperature of the post-expander exhaust treatment device 6 will be decreased.

Upon adjusting the first and second expander inlet valve closing timings, the first and second expander variable valve actuation mechanisms 406, 506 are controlled so as to adjust S504 the first and second expander exhaust valves 404, 504 to minimize the pressure difference across the expander exhaust valves 404, 504 at the opening events of the expander exhaust valves.

Further the first and second expander exhaust valves 404, 504 are adjusted to minimize the pressure difference across the expander inlet valves 403, 503 at opening events of the expander inlet valves; this is done by adjusting the timing of the expander exhaust valve closing events, thereby controlling the degree of recompression in the first and second expanders.

In alternative embodiments, instead of determining the post-expander exhaust treatment device temperature, the temperature of the exhaust gases may be determined, and the swallowing capacities of the first and second expanders may be adjusted based on the determined exhaust gas temperature.

Figure 5:
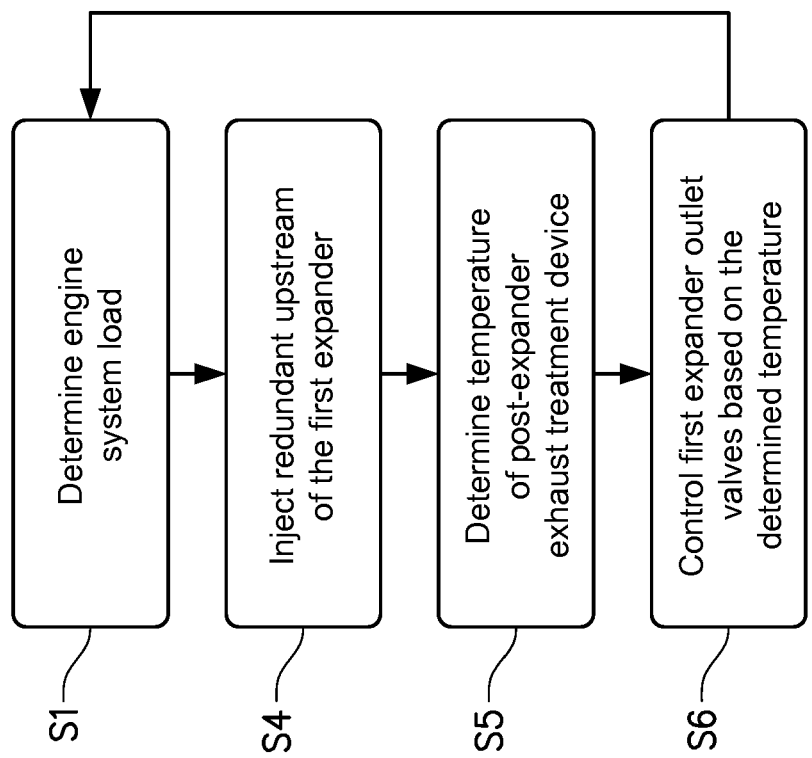
FIG. 5 is a flow diagram depicting steps in an alternative method carried out in the system in FIG. 3.

Reference is made to FIG. 5 depicting steps in a further method carried out in the system described above. During an operation of the engine system 1, the air guide 901 may present a pressure within the range of 8-12 bar and a temperature within the range of 250-350° C. The method involves controlling the temperature of the process in the pre-expander exhaust treatment device 7. During operation of the engine system in the vehicle, the control unit 15 determines S1 the load of the engine system, as described above.

The method involves, as in the example described with reference to FIG. 4, controlling the injector 8, to inject S4 redundant upstream of the first expander for the post-expander exhaust treatment device. The timing and duration of the reductant injections are coordinated with the actuations of the first expander inlet valve 403, in order to enable good mixing of the reductant with the exhaust gases in the expander.

The method also involves controlling the temperature of the process in the post-expander exhaust treatment device 6. During operation of the engine system in the vehicle, e.g. during a cold start event of the engine system, the control unit 15 determines S5 the temperature of the post-expander exhaust treatment device 6, as described above.

Based on the determined post-expander exhaust treatment device temperature, and optionally the engine load, the first expander outlet valves 404 are controlled S6 in the first expander cycles so as to control the post-expander exhaust treatment device temperature. More specifically, by opening the first expander outlet valves 404 relatively early in the cycles, the expansion ratio of the first expanders 4 will be reduced, and some heat is distributed from providing power for the first expander crankshaft drive to providing heat to the post-expander exhaust treatment device 6. Thereby, the temperature of the post-expander exhaust treatment device 6 may be increased. Also, energy not absorbed by the first expanders 4 due to the reduced expansion ratio, may be absorbed by the second expanders 5. By opening the first expander outlet valves 404 relatively late in the cycles, the heat escape from the first expanders 4 may be reduced, whereby the temperature of the post-expander exhaust treatment device 6 may be decreased.

During the engine system operation, the controller 14 periodically repeats said steps of engine load determination S1, reductant injection S4, post-expander exhaust treatment device temperature determination S5, and first expander outlet valve control S6.

In the configuration described above with an oxidation catalyst 10 and a particulate filter 11, the pre-expander exhaust treatment device 7 suitably presents a temperature within the range of 550-800° C. and a pressure within the range of 10-25 bar. The methods described with reference to FIG. 4 and FIG. 5 provide effective manners of controlling the temperature of the post-expander exhaust treatment device 6, for keeping it within a range that is beneficial to the processes therein. In the configuration described above with an SCR catalyst, the post-expander exhaust treatment device 6 suitably presents a temperature within the range of 300-450° C. More generally, the methods provide an advantageous distribution and control of the temperatures along the path of the exhaust gases, so that exhaust treatment devices distributed along said path are provided with different temperatures which are each optimized for the respective exhaust treatment device.

In this example, the compressor 9 may be arranged to compress the air to a volumetric ratio of 1:1-1:8, preferably 1:4-1:6, in dependence on the actuation of the variable compressor inlet and outlet valves 913, 914. The combustors 3 may be arranged to compress the air from the compressors to a ratio of 1:8-1:14, preferably 1:10-1:12, and to expand the gases in the combustors 3 by a ratio of 1:4-1:14, preferably 1:10-1:12, in dependence on the actuation of the variable combustor inlet and outlet valves 303, 304. The first expander 4 may be arranged to expand the exhaust gases with a ratio of 1:2-1:6, preferably 1:3-1:4, and the second expander 5 may be arranged to expand the exhaust gases with a ratio of 1:2-1:6, preferably 1:2-1:3, in dependence on the actuation of the variable first and second expander inlet and outlet valves 403, 404, 503, 504. Specifically, as suggested, the first expander expansion ratio may be adjusted to control the temperature of the post-expander exhaust treatment device 6. It should be noted that in embodiments of the invention, any of the compression and expansion ratios may be outside the intervals mentioned above.

Figure 6:
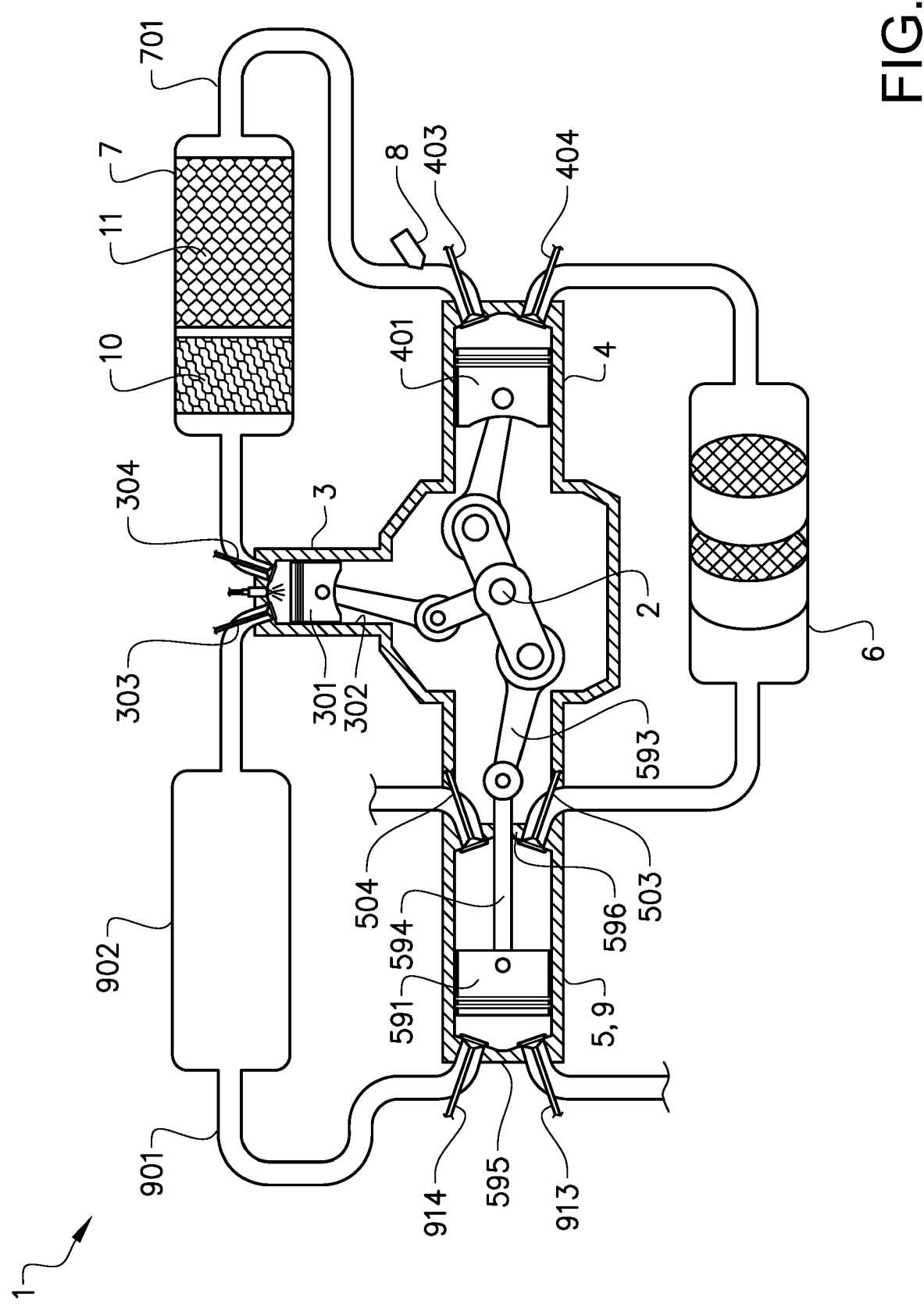
FIG. 6 is a schematic cross-sectional view of an engine system according to an alternative embodiment of the invention.

Reference is made to FIG. 6, showing an engine system according to an alternative embodiment of the invention. This embodiment shares essential features with the embodiment described with reference to FIG. 2-FIG. 5. However, some further advantageous features are also provided.

In the embodiment in FIG. 6, each pair of a second expander 5 and a compressor 9 are integrated so as to share a piston 591 which is connected to the crankshaft 2. Thus, the compressors 9 and the second expanders 5 form three compressor and expander combinations 5, 9, in which the pistons 591 is arranged to reciprocate in shared cylinders 592.

In FIG. 6 one of the compressor and expander combinations 5, 9 is shown. The compressor and expander combination 5, 9, herein also referred to as a combined compressor and expander 5, 9, presents on a first side of the piston 591 a first head 595, and compressor inlet and outlet valves 913, 914, arranged to be actuated by a compressor valve actuator assembly, (not shown), similarly to the compressor inlet and outlet valves 913, 914 in the embodiment in FIG. 3. The compressor and expander combination 5, 9 also presents on a second side of the piston 591 a second head 596, and second expander inlet and outlet valves 503, 504, arranged to be actuated by a second expander valve actuator assembly, (not shown), similarly to the second expander inlet and outlet valves 913, 914 in the embodiment in FIG. 3.

The piston is connected to the crankshaft 2 via a connecting rod 593 and an extension rod 594. The extension rod connects the piston 591 with the connecting rod 593, and extends with a tight fit through an opening in the second head 596. Said tight fit may be accomplished, e.g. with a suitable arrangement of a sliding bush or piston rings.

The compressor and expander combination 5, 9 is arranged to admit, by actuation of the compressor inlet valve 913, air to the shared cylinder 592, on the first side of the piston 591. The compressor and expander combination 5, 9 is further arranged to compress the air by the piston movement caused by the crankshaft rotation. The compressor and expander combination 5, 9 is further adapted to admit, by actuation of the second expander inlet valve 503, exhaust gases, received from the first expander 4 and the post-expander exhaust treatment device 6, on the second side of the piston 591. The compressor and expander combination 5, 9 is arranged to expand the admitted exhaust gases, thereby urging the piston 591 towards the first heat 595.

By the urge of the piston 591 towards the first heat 595, in addition to driving the crankshaft 2, the compressor and expander combination 5, 9 is arranged to deliver energy for the air compression in a direct manner. More specifically, the exhaust gases provides a direct pressure on the shared piston 591 in turn serving to directly exert a direct pressure on the air. Thereby, mechanical losses for the transfer of this energy is substantially eliminated. Also, compared to providing the compressor and expander separately, the compressor and expander combination 5, 9 results in a reduced number of parts, since the piston 591 and the cylinder 592 are shared, thereby reducing the complexity and cost of the engine system 1.

It should be noted that in alternative embodiments, the compressor 9 and the first expander 4 may be integrated so as to share a piston which is connected to the crankshaft 2, similarly to what is described with reference to FIG. 6.

It should be noted that while the inlet and outlet valves 303, 304, 403, 404, 503, 504, 913, 914 in the drawings are depicted as poppet valves, any one of them may be provided in any suitable alternative form, such as a sleeve valve.

Figure 7:
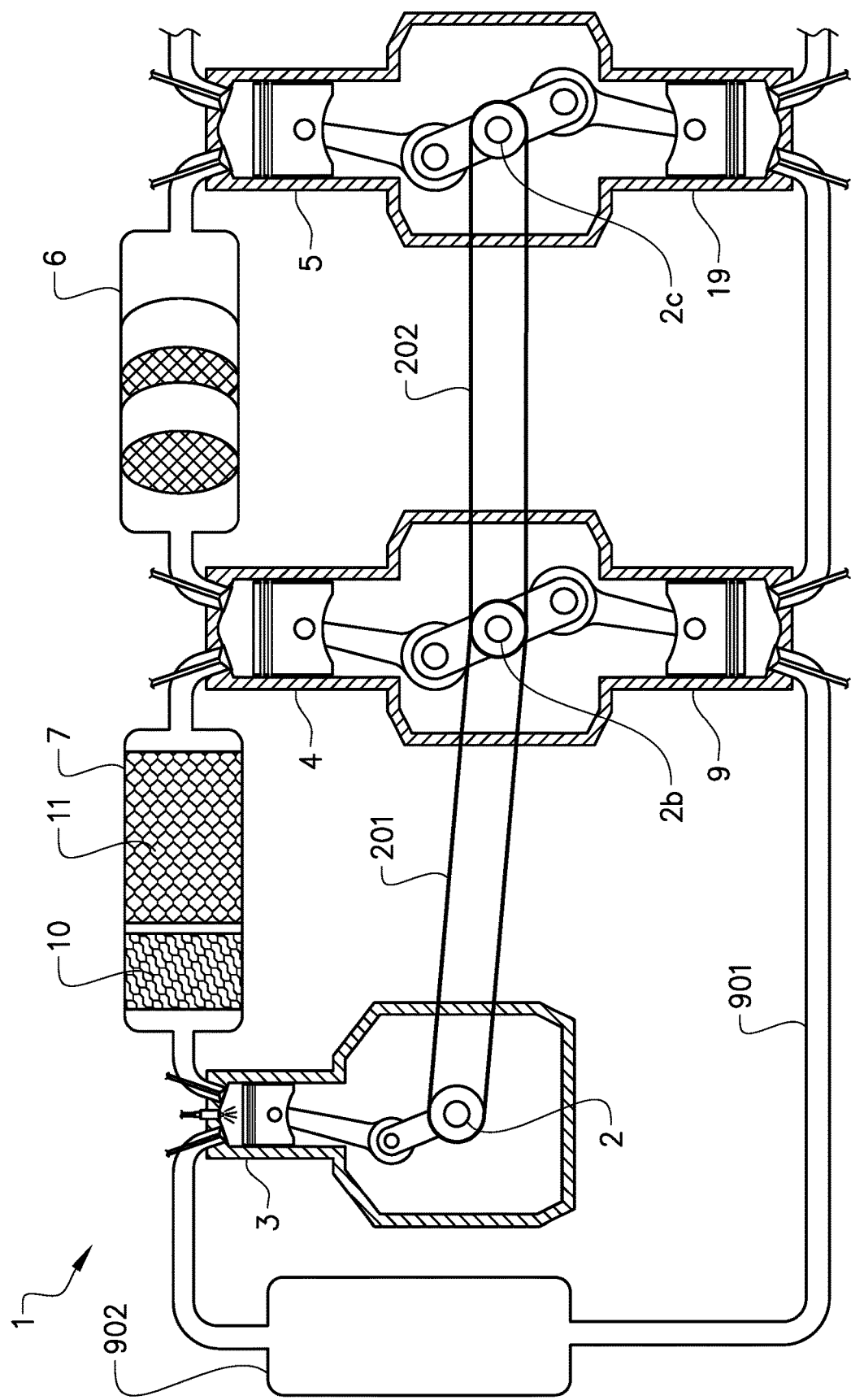
FIG. 7 is a schematic cross-sectional view of an engine system according to another alternative embodiment of the invention.

Reference is made to FIG. 7, showing an engine system according to a further alternative embodiment of the invention. This embodiment shares essential features with the embodiment described with reference to FIG. 2-FIG. 5. However, some further advantageous features are also provided.

In FIG. 3, the pistons of the compressors 9, the first expanders 4, and the second expanders 5 are indirectly connected to the crankshaft 2. However, the invention is applicable also to engine systems, where pistons of the compressors 9 and the first expanders 4 are indirectly connected to the crankshaft 2, via an additional crankshaft 2*b* and a chain or belt connection 201, as shown in FIG. 7. In FIG. 7, the pistons of the compressors 9 and the first expanders 4 are directly connected to the additional crankshaft 2*b*, and the chain or belt connection 201 is provided between the crankshafts 2, 2*b*. Any suitable type of connection between the crankshafts 2, 2*b* may be provided. For example, as an alternative to the chain or belt connection 201, a toothed gear wheel connection between the crankshafts 2, 2*b* may be provided.

In should be noted that in the embodiment in FIG. 7, the second expander 5 comprises a piston arranged to drive a further crankshaft 2*c* connected to the additional crankshaft 2*b*, via a further chain or belt connection 202. The system also comprises an additional compressor 19 with a piston connected to the further crankshaft 2*c*. The additional compressor 19 is located upstream of the piston compressor 9, and is arranged to provide an additional compression step.

Figure 8:
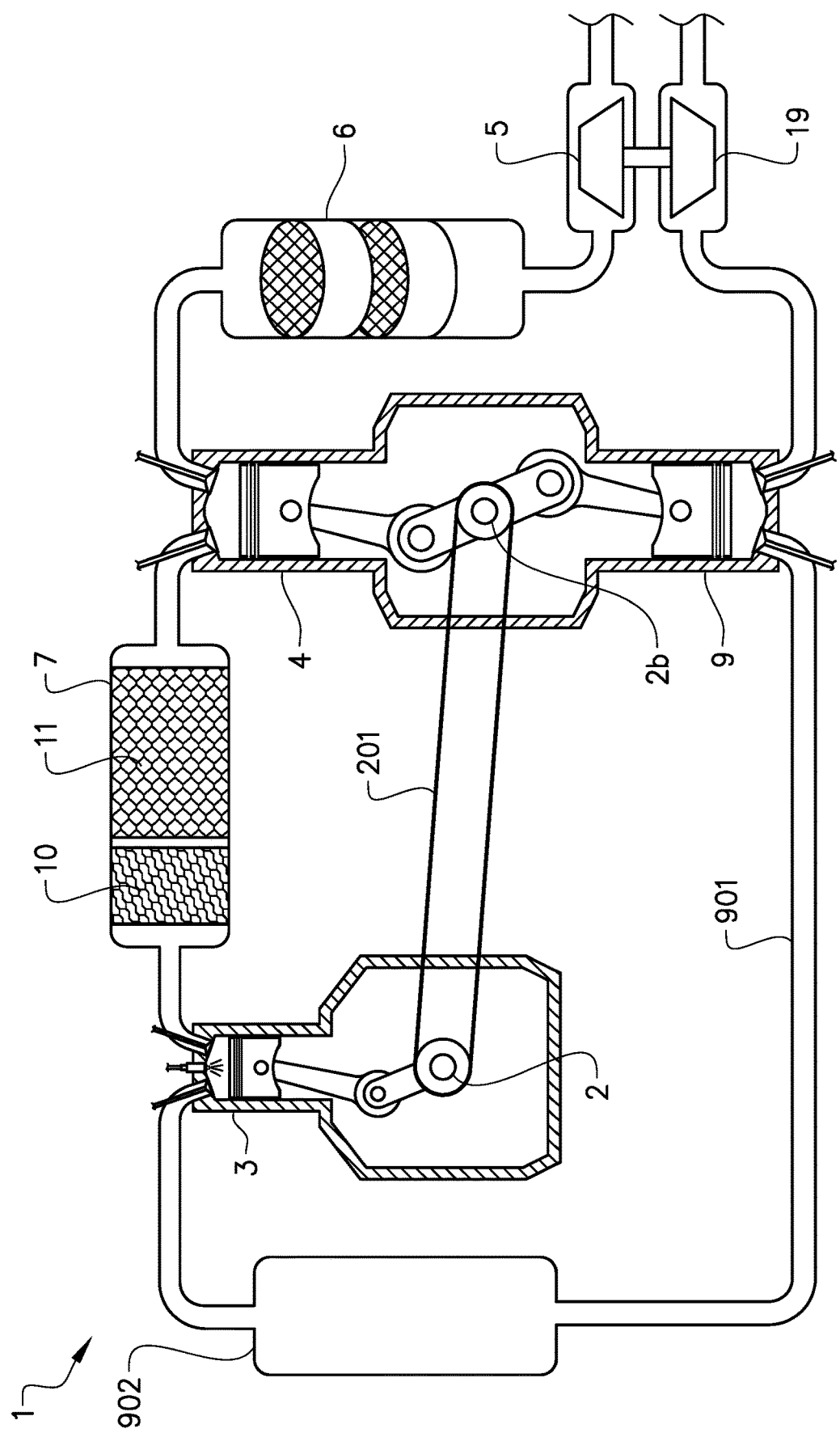
FIG. 8 is a schematic cross-sectional view of an engine system according to yet a further embodiment of the invention.

Reference is made to FIG. 8, showing an engine system according to yet another embodiment of the invention. This embodiment shares essential features with the embodiment described with reference to FIG. 7. However, in the embodiment in FIG. 8, the second expander 5 comprises a turbine arranged to drive an additional compressor 19.

The additional compressor 19 is provided in the form of a centrifugal compressor 19, which is directly connected by means of a shaft to the turbine of the second expander. The additional compressor is located upstream of the piston compressor 9, and is arranged to provide an additional compression step.

It is to be understood that the present invention is not limited to the embodiments described above and illustrated in the drawings; rather, the skilled person will recognize that many changes and modifications may be made within the scope of the appended claims.

The invention claimed is:

1. A method for an internal combustion engine system comprising
    at least one combustor,
    a first expander arranged to receive exhaust gases from at least one of the at least one combustor, and to expand and extract energy from the exhaust gases, wherein the system comprises a crankshaft, and the combustor comprises a piston arranged to reciprocate in a cylinder, and to drive the crankshaft, wherein the first expander is a piston expander arranged to drive the crankshaft with the extracted energy, comprising providing an exhaust treatment device arranged to receive exhaust gases from the first expander, to process the received exhaust gases, the method comprising determining the temperature in the exhaust treatment device, and adjusting the swallowing capacity of the first expander to control the temperature of the process in the exhaust treatment device.

2. A method according to claim 1, wherein the internal combustion engine comprises a second expander arranged to receive exhaust gases from the first expander, and to expand and extract energy from the exhaust gases, wherein the processed exhaust gases are delivered to the second expander.

3. A method according to claim 1, comprising increasing the temperature of the exhaust treatment device by increasing the swallowing capacity of the first expander, and decreasing the temperature of the exhaust treatment device by decreasing the swallowing capacity of the first expander.

4. A method according to claim 1, wherein the first expander is arranged to receive the exhaust gases by means of an expander inlet valve, an expander variable valve actuation mechanism being arranged to actuate the expander inlet valve, wherein adjusting the swallowing capacity of the first expander comprises adjusting the expander variable valve actuation mechanism.

5. A method according to claim 3, comprising increasing the swallowing capacity of the first expander by delaying a closing event of the expander inlet valve, and decreasing the swallowing capacity of the first expander by advancing the closing event of the expander inlet valve.

6. A method according to claim 3, wherein the first expander is arranged to expel the exhaust gases by means of an expander exhaust valve, the expander variable valve actuation mechanism being arranged to actuate the expander exhaust valve, the method comprising controlling the expander variable valve actuation mechanism so as to adjust the expander exhaust valve to minimize the pressure difference across the expander exhaust valve at an opening event of the expander exhaust valve, and/or to minimize the pressure difference across the expander inlet valve at an opening event of the expander inlet valve.

7. A method according to claim 2, comprising
adjusting the swallowing capacity of the second expander to control the temperature of the process in the exhaust treatment device.

8. A method according to claim 7, comprising increasing the temperature of the exhaust treatment device by decreasing the swallowing capacity of the second expander, and decreasing the temperature of the exhaust treatment device by increasing the swallowing capacity of the second expander.

9. A method according to claim 7, wherein adjusting the swallowing capacity of the first expander and/or the second expander is done in dependence on a rotational speed of the engine system and/or a requested torque for the engine system.

10. A method according to claim 7, comprising increasing the temperature of the exhaust treatment device by increasing the swallowing capacity of the first expander and decreasing the swallowing capacity of the second expander, and decreasing the temperature of the exhaust treatment device by decreasing the swallowing capacity of the first expander and increasing the swallowing capacity of the second expander.

11. A method according to claim 10, comprising determining a temperature of the exhaust gases and, with an increasing exhaust gas temperature, decreasing the swallowing capacity of the first expander and increasing the swallowing capacity of the second expander, and, with a decreasing exhaust gas temperature, increasing the swallowing capacity of the first expander and decreasing the swallowing capacity of the second expander.

12. A computer program comprising program code means for performing the steps of claim 1 when the program is run on a computer.

13. A computer readable medium carrying a computer program comprising program code means for performing the steps of claim 1 when the program is run on a computer.

14. A control unit arranged to perform the steps of claim 1.

15. A method for an internal combustion engine system comprising
a combustor arranged to combust air and fuel,
an expander arranged to receive, expand and extract energy from exhaust gases from the combustor, and to expel the exhaust gases from the expander by means of an expander exhaust valve, and
wherein the system comprises a crankshaft, and the combustor comprises a piston arranged to reciprocate in a cylinder, and to drive the crankshaft,
wherein the expander is a piston expander arranged to drive the crankshaft with the extracted energy, and
providing an exhaust treatment device arranged to receive the expelled exhaust gases from the expander and to process the exhaust gases,
the method comprising determining the temperature in the exhaust treatment device, and controlling the expander exhaust valve to control the temperature of the process in the exhaust treatment device.

16. A method according to claim 15, wherein the control of the expander exhaust valve comprises controlling the temperature of the process in the exhaust treatment device to be within the range of 300-450° C.

* * * * *